Jan. 16, 1968 A. B. SWAIN, JR., ET AL 3,364,041
GLASS COMPOSITION AND METHOD
Filed Nov. 24, 1965 2 Sheets-Sheet 1
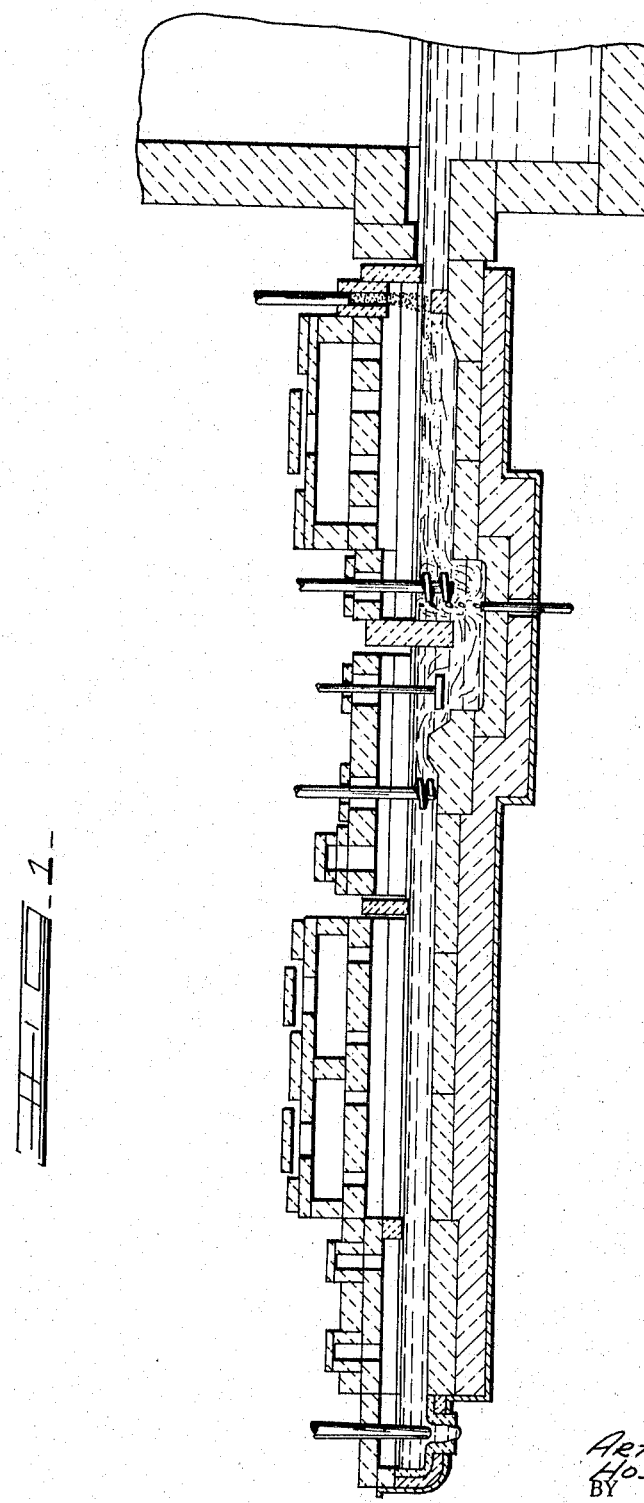
INVENTORS
ARTHUR B. SWAIN, JR.
HOSSEIN R. KESHARI
BY
J.R. Nelson and
W.A. Schuck
ATTORNEYS

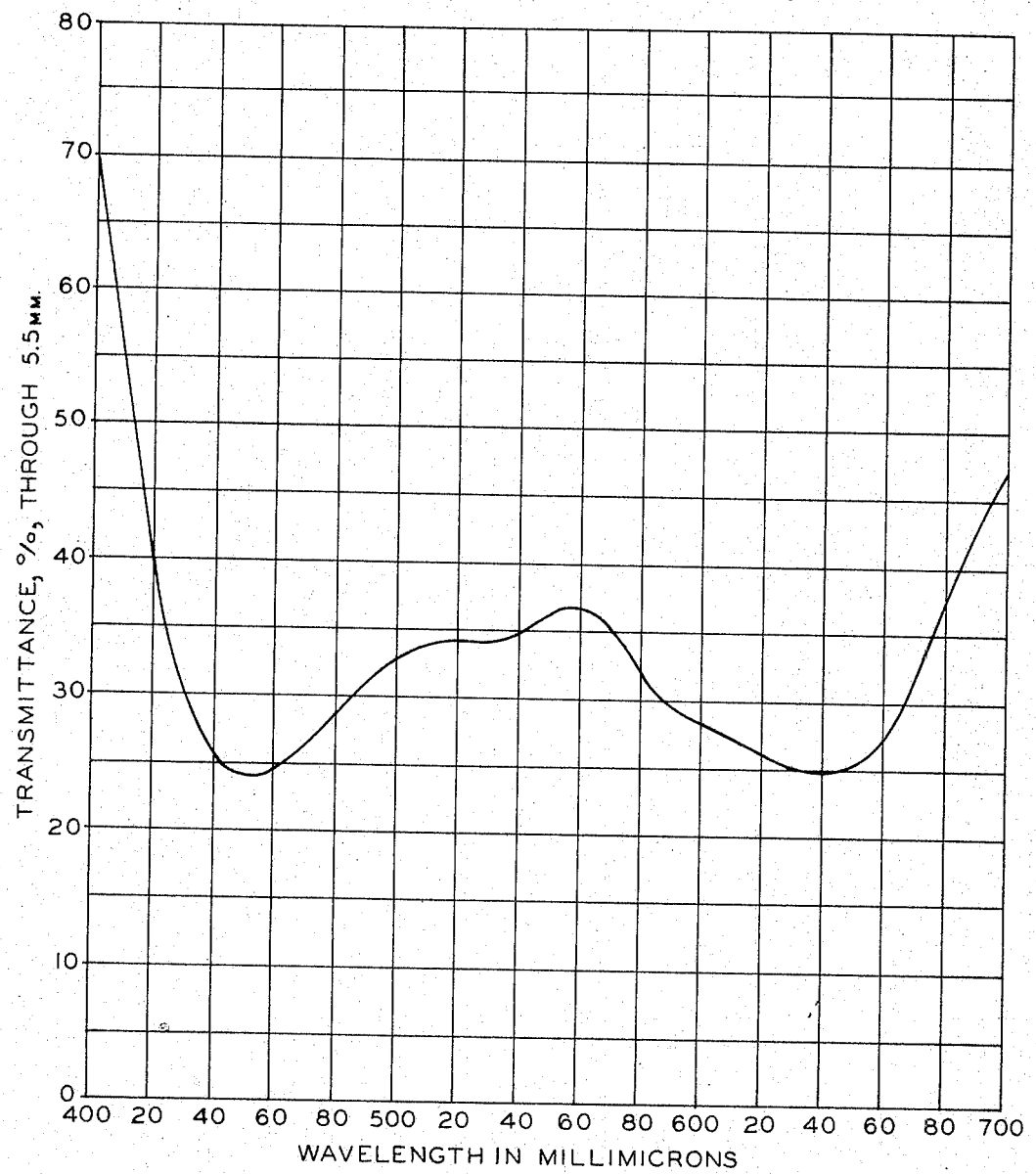

United States Patent Office 3,364,041
Patented Jan. 16, 1968

3,364,041
GLASS COMPOSITION AND METHOD
Arthur E. Swain, Jr., and Hossein R. Keshari, Toledo, Ohio, assignors to Owens-Illinois, Inc., a corporation of Ohio
Filed Nov. 24, 1965, Ser. No. 509,545
9 Claims. (Cl. 106—52)

This invention relates to the manufacture of colored glass. More particularly, the invention relates to highly colorant enriched green frit glass batch compositions and to the vitreous compositions made therefrom. Also, the invention relates to a method of manufacturing green composite glasses using said green frit glass of the invention.

In conventional operations for producing colored glasses, one of the very substantial problems encountered is in changing a glass melting tank over from one color to another or from a colorless to a colored glass making operation.

The problem arises from the fact that, for example, the first color composition must be dumped and the tank refilled with a second color composition. Usually the tank change is so scheduled as to permit product run-out over as large a portion of the transition as possible. However, there is an intermediate interval of one to three days duration wherein the prior color tails out and the new color begins, in which the glass composition is in transition, and as such must be dumped. This transition glass is off-color. Considering the fact that glass melting tanks hold up to 100 tons of melt or more, it will be understood that the transition caused by dumping is very expensive.

This, of course, brings to mind an ideal situation where a colorless base glass composition would be used in the tank and colorant as desired added at the forehearth to fulfill specific end color requirements. By so operating, the conditions of firing of the tank and the feeding of batch ingredients into the tank would all become fixed factors. Careful adjustment and stabilization of tank conditions would lead to the production of high quality products. The tank conditions, once stabilized, would remain so and variables would be avoided.

Such a forehearth coloring method has important advantages over the tank method for producing colored glass, in which the colorant material is added to the base glass batch and introduced directly into the melting and refining tank. Thus, by the forehearth method, as many colors can be produced simultaneously as there are forehearths associated with the melting furnace.

Further, in a given forehearth, a transition from one color to another can be made in a matter of one to three hours as contrasted to a matter of one to three days to change a tank from one color to another.

Also, if desired, both clear and colored glassware can be made simultaneously from the same melting tank, by using different forehearths, and adding colorant frit glass to some, and running the clear base glass through others.

In manufacturing the green glass by techniques of the present invention, it is desirable to achieve high pulls or production rates from a selected forehearth or forehearths utilizing the invention. This may be achieved up to 40 tons per operating day under the one modification herein disclosed.

Further smaller quantities of colorant materials are required by the forehearth coloring method than by the known melting tank practice where the colorant is incorporated into the tank batch and melted with substantial losses of volatile colorant material during the extended melting and refining operation.

Additionally, the manufacture of grey-green glasses by conventional methods has presented serious economic problems because of inefficient use of fuel. These dark glasses have an absorption band in the infrared range of the spectrum causing much of the radiant energy of the flames to be absorbed in the upper layer of molten glass. Since commercial melting furnaces are designed to accommodate a depth of several feet of molten glass, heat transmission is a serious problem. Since colorless flint glass has a high transmission characteristic in the near infrared region of the spectrum, the present invention permits a substantial reduction in the melting costs by permitting the dark green colorants to be added after the melting has been completed.

Even with the aid of the aforesaid forehearth addition techniques, there were still several problems to be overcome. The precise problem still presented to the art was to manufacture a commercially desirable grey-green glass composition possessing low purity and brightness and having a dominant wave length between 540 and 560 millimicrons.

It is therefore an object of the present invention to provide a novel grey-green glass composition with low purity and brightness and having a dominant wave length in the range of 540–560 millimicrons.

It is another object of the invention to provide a novel colorant frit glass composition that will produce a dark grey-green color when admixed with a substantially colorless base glass.

Another important object is to provide a method of adding the colored grey-green frit glass to the bulk stream of the molten glass while the molten glass is flowing through the forehearth to the forming equipment.

Still another object is to provide a frit glass composition that is capable of readily admixing with a colorless soda-lime base glass to form a dark grey-green composite in the forehearth of a conventional furnace so as to permit pull rates of up to 40 ton per operating day.

Another object of this invention is to provide a method of producing a glass composition possessing a dark, grey-green coloration without the heat transfer problems normally associated with the melting and fining of dark grey-green batch materials.

Still a further object of this invention is to provide a colored frit glass composition that is capable of admixing with an essentially colorless base glass to form a grey-green coloration in aforesaid base glass through the presence of oxides of hexavalent chromium, trivalent chromium, cobalt, copper and nickel in proper combination without departing from the dictates of commercial practicality.

In attaining the objects of this invention one feature resides in the preparation of a frit glass containing, in addition to the ordinary glass forming oxides, sufficient $Cr_2O_3$, $CrO_3$, CoO, CuO and NiO in proper combination to produce a dark grey-green coloration. The frit glass should also contain sufficient alkali oxides or alkali oxides in combination with other fluxes such as boric oxides, to facilitate the dissolution of $Cr_2O_3$.

Another feature resides in admixing the aforesaid frit under proper conditions of agitation, in a forehearth of a commercial glass melting furnace, with an essentially colorless soda-lime base glass composition to produce the desired grey-green coloration.

The above and other objects, features and advantages of the present invention will become apparent to those skilled in the art upon reading the detailed description contained herein.

FIGURE 1 is a longitudinal sectional elevation of a preferred form of apparatus for use in practicing our invention.

The base glass is melted and refined in the furnace tank 10. The molten glass 11 flows through the furnace outlet 12 into the channel provided by the forehearth 13. The forehearth is provided at its forward end with an outlet 14 or other means for the discharge of the glass which may be under the control of plunger 15. The plunger may be operated to control the volume of glass passing through the outlet 14 either by adjustment with respect to the outlet to control the flow therethrough, or by reciprocation thereover to discharge gobs of glass therethrough.

The grey-green frit glass is fed to the surface of the glass in the forehearth channel from a feeder tank (not shown) through the discharge spout 17. Discharge blocks 18, built into the upper wall or roof of the forehearth 19, are formed with vertical channels in register with the spout 17 through which the frit falls by gravity into the forehearth. The frit which is in powdered or granulated form is spread over the surface of the flowing glass. The frit falls on the glass directly over a dam 20 of Zac or other refractory material. The dam serves to produce a comparatively rapid local surface flow of the glass which aids in admixing the frit and base glass.

The forehearth comprises a section or chamber 22, through which the frit is carried in and in which it is melted. The temperature in this section must be at least as high as the melting temperature of the frit and is usually maintained about 2200–2300° F.

In the well section 28, the temperature is generally lowered approximately 50° F. by the water cooled stirring members 26 and from this point on the glass it is gradually cooled to an average operating temperature at outlet 14 of about 2070° F. Means for effecting a thorough mixing of the melted frit with the base glass include a first set of stirrers 24, bubblers 25, a second set of stirrers 26 and a third set of stirrers 27. The forehearth is formed with a well 28 and a deep well skimmer 29 extending downward within the well.

In another form, the frit may be added in the molten state. It is therefore contemplated herein that the term "frit" may include either form of the colorant glass material.

The amount of frit entering the forehearth is usually only a small fraction of the amount of base glass flowing from tank 10, the proportion depending upon the composition of the frit, the intensity of the color desired in the end product, or other variable factors. In general, the amount of frit added usually varies from about 1% to about 5% by weight based on the amount of base glass.

The above described apparatus is only exemplary of several forms of apparatus which may be used in practicing the invention, and illustrates, rather schematically, the adoption of the method to existing forehearth constructions. For additional features of a suitable apparatus for mixing colorants in the glass furnace forehearth see U.S. Patent No. 3,057,175, R. R. Rough and A. B. Swain, Jr., issued on Oct. 9, 1962.

THE FRIT GLASS OF INVENTIONS AND METHOD OF PREPARATION

TABLE I.— BATCH DATA FOR FRIT GLASSES (IN POUNDS)

| Component | Ex. I | Ex. II | Ex. III |
|---|---|---|---|
| Sand | 2,000 | 2,000 | 2,000 |
| Soda Ash | 1,350 | 1,059 | 1,209 |
| Limestone | 557 | 557 | 557 |
| Iron chromite | 102 | 42 | 76.12 |
| Potassium dichromate | 102 | 35 | 65 |
| Black cobalt oxide | 19.5 | 8 | 14.69 |
| Black copper oxide | 101 | 41 | 75.19 |
| Black nickel oxide | 172 | 70 | 128.63 |

TABLE II.—COMPOSITIONAL DATA FOR FRIT GLASS OF TABLE I IN PERCENT, BY WEIGHT

| Theoretical Chemical Analysis | Ex. I | Ex. II | Ex. III | Operable Range |
|---|---|---|---|---|
| $SiO_2$ | 56.04 | 64.21 | 59.78 | 55–65 |
| $Al_2O_3$ | 0.53 | 0.32 | 0.40 | 0–1 |
| $Fe_2O_3$ | 0.81 | 0.41 | 0.61 | 0–1 |
| CaO | 8.48 | 9.73 | 9.08 | 5–15 |
| MgO | 0.41 | 0.26 | 0.15 | 0–5 |
| $Na_2O$ | 21.89 | 19.71 | 20.94 | 15–25 |
| $K_2O$ | 0.92 | 0.37 | 0.65 | 0–2 |
| Total Cr as $Cr_2O_3$ | 2.73 | 1.17 | 2.01 | 1.1–2.8 |
| CuO | 2.83 | 1.32 | 2.25 | 1.3–2.9 |
| CoO | 0.54 | 0.26 | 0.41 | 0.2–0.6 |
| NiO | 4.81 | 2.25 | 3.72 | 2.2–4.9 |

TABLE III.—PREFERRED RANGE OF COLORANTS

Colorant:                    Preferred range of colorant
$Cr_2O_3$ _____ 1.6–2.30
$CrO_3$ _____ 0–0.3
CuO _____ 1.8–2.50
CoO _____ 0.2–0.4
NiO _____ 3.3–3.5

*Example I*

In one specific embodiment of the present invention, the batch ingredients listed in the corresponding column of Table I are fired in a frit furnace at a melting temperature of about 2750° F. To achieve the desired chromium concentration, part of the chromium, 45% is introduced as iron chromite ($Cr^{+3}$) and 55% is introduced as potassium dichromate ($Cr^{+6}$). This is because $Cr_2O_3$ ($Cr^{+3}$) is not very soluble in the alkaline soda-lime-flint glass. After complete dissolution, the $Cr^{+6}$ is essentially reduced to $Cr^{+3}$ by interaction with the nickel oxide, cobalt oxide and the copper oxide under condition of ½ to 1% excess oxygen in the melting fires. The molten colorant glass is suitably converted to powdered frit by feeding as a stream from the outlet of the melting furnace and chilling rapidly. The chilling is effected by flowing the molten stream through water cooled rolls and then into a body of water so that the glass breaks up into granular frit form. If desired, the granular glass frit can then be further reduced in particle size by grinding. We have found the powdered frit glass particles in the range of −8 +30 mesh size are satisfactory for the purposes of this invention.

As an alternative method, the frit may be melted and directly fed into the forehearth as the molten colorant glass.

In any event, the theoretical composition of the frit glass based on the above mentioned batch charge is listed in the corresponding column of Table II. The preferred range of colorant is set forth in Table III. It should be emphasized that it is desirable to have substantially all of the chromium in the frit glass and subsequently in the finished composite glass, present as $Cr_2O_3$. $CrO_3$ provides a strong yellow coloration and also increases the color purity. Since both of these properties are detrimental to the present invention, the copper oxide is introduced to mask the yellow cast resulting from any unreduced $CrO_3$.

*Example II*

The corresponding frit glass of Table I is prepared according to the method of Example I. Composition data is set forth in Table II and Table III.

*Example III*

The corresponding frit of glass of Table I is prepared according to the method of Example I. Compositional data is set forth in Table II and Table III.

USE OF FRIT GLASSES

Before describing the manner in which frits of this invention are incorporated into colorless base glasses to produce grey-green composite glasses, a description of suitable base glasses and desired composite glass optical properties will be provided to serve as an appropriate background upon which the invention can be superimposed.

Base glasses that can be used in practicing the present invention may have an actual analysis of oxides encompassed within the ranges set out below. Generally, it will be found that glasses falling within these ranges are soda-lime-flint glasses commonly used in the manufacture of colorless containers.

RANGE OF OXIDES IN BASE GLASS COMPOSITIONS

| Constituent: | Percent by weight |
|---|---|
| $SiO_2$ | 60–75 |
| $Al_2O_3$ | 0.3–10 |
| CaO+MgO | 6–15 |
| $Na_2O$ | 12–18 |
| $K_2O$ | 0–5 |
| BaO | 0–5 |
| Decolorizer [1] | Trace |

[1] Any compatible decolorizer can be used. The function here is to mask the color produced by any iron that may be present as an impurity in the batch material. We have found that selenium in the range of 0.00025–0.00035% is effective.

TABLE IV.—SPECIFIC COMPOSITION OF A SUITABLE BASE GLASS

| Constituent: | Percent by weight |
|---|---|
| $SiO_2$ | 72.08 |
| $Al_2O_3$ | 1.70 |
| $Fe_2O_3$ | 0.039 |
| CaO | 11.59 |
| MgO | 1.00 |
| $Na_2O$ | 13.35 |
| $K_2O$ | 0.20 |
| Selenium | 0.00025–0.00035 |

The conditions and procedures for making the above base glass is conventional and such conditions are well known to those skilled in the art as exemplified in Table IX B–II on page 245 of "Handbook of Glass Manufacture" by Tooley, Ogden Publishing Company, New York, N.Y., 1953.

In accordance with the broad principles of the present invention, the frit glasses of the invention can be added to substantially any oxidized glass. Accordingly, the exemplary soda-lime-flint glass is suggested as applicable for commercial container production.

DESCRIPTION OF OPTICAL PROPERTIES

The optical properties hereinafter set forth are C.I.E. colorimetric values based upon the I.C.I. Chromaticity Diagram. C.I.E. refers to the First International Commission of Illumination and the diagram from which the values are taken defines color in terms of mixtures of theoretical color lights. The C.I.E. system makes possible the exact specification of colors by means of a "color map." The C.I.E. system of color notation specifies the color of glasses in terms of brightness, purity and dominant wavelength.

"Brightness" which is usually expressed in terms of percentage, is the amount of visual response to a normal observer to the radiation emergent from a transparent object relative to the response in this observer to the radiation incident upon this object. Thus brightness may be briefly termed the lightness of color of an object.

"Purity" which is also normally expressed in terms of percentage is a measure of the monochromaticness of a color with monochromatic light having a purity of 100%. By diluting the monochromatic radiation with white light made up of all wavelengths, we thereby dilute the color and reduce purity.

"Dominant Wavelength" usually expressed in millimicrons (m$\mu$), is the wavelength of monochromatic light appearing to the eye to have the same hue as the mixed light actually encountered. These concepts will be hereinafter discussed in relation to the finished composite glass.

COMPOSITE GLASS PRODUCTION

In the production of glass containers, a base glass is prepared in melting tanks of several hundred ton capacity. The batch constituents are added and proceed through the tank under melting and refining conditions. The glass is issued out of the fining end of the melting tank by being run through one or a plurality of forehearths which are provided in connection with the tank to feed the forming machines.

Generally, the colorless base glass issues from the melting tank into the forehearth at a temperature of about 2300° F. The frits made in accordance with the present invention are well adapted for addition to the base glass at such temperature conditions in finely divided form as from −8 to +30 mesh size. Stirring means and mixing baffles known in the art are used to produce homogeneous admixtures of the frit into the colorless base glass to produce a uniformly, highly colored composite glass. A specific type of forehearth equipped with stirring is set forth in aforesaid FIG. 1.

Example IV

To produce a dark grey-green composite glass with the desired characteristic of low purity and brightness, the frit of Example III was added to the forehearth of a furnace producing the base glass listed in Table IV at the rate of about 35 lb. of frit glass per ton of base glass. In practice, the amount of frit glass desirably ranges from about 1% to about 3% of the amount of base glass flowing through the forehearth. The mixing was accomplished in an apparatus similar to that shown in FIG. 1. The frit was at ambient temperature and the base glass was about 2300° F. The grey-green composite glass was then formed into glass containers by conventional forming equipment.

The composite glass so produced had the following characteristics:

| | | Preferred Range |
|---|---|---|
| Dominant Wavelength | 554.61 | 540–560 |
| Purity, percent | 16.10 | 10–18 |
| Brightness, percent | 13.31 | 12–18 |

Optical measurements refer to 10 mm. thickness sample.

A complete color profile for the subject glass is given in FIG. 2.

The following table contains the actual composition of the prepared composite glass. This data is presented by way of illustration and need not be interpreted necessarily as a limitation of the invention.

TABLE V

| Constituent of Composite Glass | Frit Glass of Table II-3 and Base Glass of Table IV | Preferred Range |
|---|---|---|
| $SiO_2$ | 71.32 | 60–75 |
| $Al_2O_3$ | 1.70 | 0.3–10 |
| CaO | 11.50 | 6–15 |
| MgO | 0.83 | |
| $Na_2O$ | 14.11 | 12–18 |
| $K_2O$ | 0.21 | 0–5 |
| $Fe_2O_3$ | 0.058 | (1) |
| $CrO_3$ | 0.006 | 0–0.004 |
| $Cr_2O_3$ | 0.0313 | 0.029–0.035 |
| CoO | 0.009 | 0.0062–0.10 |
| CuO | 0.040 | 0.033–0.040 |
| NiO | 0.05 | 0.039–0.005 |

[1] As low as batch material permits.

It is evident from the foregoing that the present invention provides: (1) a new, optically desirable dark, grey-green glass that can be produced by the addition of a highly colored frit glass to a forehearth of a furnace producing ordinary colorless soda-lime flint glass.

While the preferred embodiments have been described above in detail, it will be understood that numerous modifications might be resorted to without departing from the spirit and scope of the invention as defined in the following claims.

What is claimed is:

1. In a method of making a grey-green soda-lime glass, the steps of preparing a molten colorless soda-lime base glass, flowing the molten base glass through a forehearth, adding to the molten base glass in the forehearth a highly enriched colorant frit consisting essentially of soda-lime flint glass composition containing

| | Percent |
|---|---|
| Total chromium as $Cr_2O_3$ | 1.1–2.8 |
| CuO | 1.3–2.9 |
| CoO | 0.2–0.6 |
| NiO | 2.2–4.9 | and forming a composite grey-green glass, the amount of frit glass added ranging from 1% to 3% by weight of the molten base glass.

2. In a method of making a colored glass composition, the steps of preparing a substantially colorless molten base glass having the following composition

| Oxide: | Percent range |
|---|---|
| $SiO_2$ | 60–75 |
| $Al_2O_3$ | 0.3–10 |
| CaO+MgO | 6–15 |
| $Na_2O$ | 12–18 |
| $K_2O$ | 0–5 |
| BaO | 0–5 |
| Decolorizer | Trace | and adding to said molten glass a highly colored frit as defined in claim 1 and prepared from a batch of the following proportions by weight:

| Ingredient: | Parts |
|---|---|
| Sand | 2000 |
| Soda ash | 1059–1350 |
| Limestone | 557 |
| Iron chromite | 42–102 |
| Potassium dichromite | 35–102 |
| Black cobalt oxide | 8–19.5 |
| Black copper oxide | 41–101 |
| Black nickel oxide | 70–172 | the amount of frit added being sufficient to yield a final colored glass composition containing colorants as follows:

| Oxide: | Percent range |
|---|---|
| $Cr_2O_3$ | 0.029–0.035 |
| $CrO_3$ | 0–0.004 |
| CoO | 0.0062–0.01 |
| CuO | 0.033–0.040 |
| NiO | 0.039–0.065 | and said final glass composition having C.I.E. colorimetric values for 10 millimeters thickness of about 12–18% brightness, 10–18% purity and 540–560 millimicrons dominant wavelength.

3. A frit composition comprising a soda-lime flint glass which is highly colorant enriched and which consists essentially of the following ingredients in the indicated percentages by weight:

| Ingredient: | Percent by weight |
|---|---|
| $SiO_2$ | 55–65 |
| $Al_2O_3$ | 0–1 |
| $Fe_2O_3$ | 0–1 |
| CaO | 5–15 |
| MgO | 0–5 |
| $Na_2O$ | 15–25 |
| $K_2O$ | 0–2 |
| Total chromium as $Cr_2O_3$ | 1.1–2.8 |
| CuO | 1.3–2.9 |
| CoO | 0.2–0.6 |
| NiO | 2.2–4.9 |

4. The frit glass as described in claim 3, wherein the specific composition is:

| Ingredient: | Percent by weight |
|---|---|
| $SiO_2$ | 59.78 |
| $Al_2O_3$ | 0.40 |
| $Fe_2O_3$ | 0.61 |
| CaO | 9.08 |
| MgO | 0.15 |
| $Na_2O$ | 20.94 |
| $K_2O$ | 0.65 |
| Total Cr as $Cr_2O_3$ | 2.01 |
| CuO | 2.25 |
| CoO | 0.41 |
| NiO | 3.72 |

5. The frit glass as described in claim 3, wherein the specific composition is:

| Ingredient: | Percent by weight |
|---|---|
| $SiO_2$ | 56.04 |
| $Al_2O_3$ | 0.53 |
| $Fe_2O_3$ | 0.81 |
| CaO | 8.48 |
| MgO | 0.41 |
| $Na_2O$ | 21.89 |
| $K_2O$ | 0.92 |
| Total Cr as $Cr_2O_3$ | 2.73 |
| CuO | 2.83 |
| CoO | 0.54 |
| NiO | 4.81 |

6. The frit glass as described in claim 3, wherein the specific composition is:

| Ingredient: | Percent by weight |
|---|---|
| $SiO_2$ | 64.21 |
| $Al_2O_3$ | 0.32 |
| $Fe_2O_3$ | 0.41 |
| CaO | 9.73 |
| MgO | 0.26 |
| $Na_2O$ | 19.71 |
| $K_2O$ | 0.37 |
| Total Cr as $Cr_2O_3$ | 1.17 |
| CuO | 1.32 |
| CoO | 0.26 |
| NiO | 2.25 |

7. A soda-lime glass composition consisting essentially of:

| | Range, percent |
|---|---|
| $SiO_2$ | 60–75 |
| $Al_2O_3$ | 0.3–10 |
| CaO | 6–15 |
| MgO | 6–15 |
| $Na_2O$ | 12–18 |
| $K_2O$ | 0–5 |
| $CrO_3$ | 0–0.004 |
| $Cr_2O_3$ | 0.029–0.035 |
| CoO | 0.0062–0.01 |
| CuO | 0.033–0.040 |
| NiO | 0.039–0.065 |

8. A glass composition described in claim 7, wherein the specific composition is:

| | Percent |
|---|---|
| $SiO_2$ | 71.32 |
| $Al_2O_3$ | 1.70 |
| CaO | 11.50 |
| MgO | 0.83 |
| $Na_2O$ | 14.11 |
| $K_2O$ | 0.21 |
| $CrO_3$ | 0.0006 |
| $Cr_2O_3$ | 0.0313 |
| CoO | 0.009 |
| CuO | 0.040 |
| NiO | 0.05 |

9. The frit glass as described in claim 3, wherein the specific range is:

| Ingredient: | Percent by weight |
|---|---|
| SiO$_2$ | 55–65 |
| Al$_2$O$_3$ | 0–1 |
| Fe$_2$O$_3$ | 0–1 |
| CaO | 5–15 |
| MgO | 0–5 |
| Na$_2$O | 15–25 |
| K$_2$O | 0–2 |
| Total chromium as Cr$_2$O$_3$ | 1.6–2.3 |
| CuO | 1.8–2.5 |
| CoO | 0.2–0.4 |
| NiO | 3.3–3.5 |

References Cited

UNITED STATES PATENTS

| Re. 25,456 | 10/1963 | Bacon et al. | 106—52 |
| 2,956,892 | 10/1960 | Duncan | 106—52 |
| 3,024,120 | 3/1962 | Babcock | 106—52 |
| 3,024,121 | 3/1962 | Hagedorn | 106—52 |
| 3,203,816 | 8/1965 | Bull et al. | 106—52 |

HELEN McCARTHY, *Primary Examiner.*